United States Patent
Yee et al.

(10) Patent No.: US 11,728,548 B1
(45) Date of Patent: Aug. 15, 2023

(54) SEPARATOR FOR ELECTROCHEMICAL CELL

(71) Applicant: Natron Energy, Inc., Santa Clara, CA (US)

(72) Inventors: Grace Marjorie Yee, San Francisco, CA (US); Daniel Friebel, San Carlos, CA (US); Ali Firouzi, Saratoga, CA (US)

(73) Assignee: Natron Energy, Inc.

( * ) Notice: Subject to any disclaimer, the term of this patent is extended or adjusted under 35 U.S.C. 154(b) by 0 days.

(21) Appl. No.: 17/650,178

(22) Filed: Feb. 7, 2022

(51) Int. Cl.
 *H01M 50/451* (2021.01)
 *H01M 10/058* (2010.01)
 *H01M 50/434* (2021.01)

(52) U.S. Cl.
 CPC ...... *H01M 50/451* (2021.01); *H01M 10/058* (2013.01); *H01M 50/434* (2021.01)

(58) Field of Classification Search
 None
 See application file for complete search history.

(56) References Cited

U.S. PATENT DOCUMENTS

| | | | |
|---|---|---|---|
| 8,951,673 B2 | 2/2015 | Wessells et al. | |
| 9,029,015 B2 | 5/2015 | Pasta et al. | |
| 9,083,041 B2 | 7/2015 | Vail et al. | |
| 9,159,502 B2 | 10/2015 | Lu et al. | |
| 9,455,446 B2 | 9/2016 | Lu et al. | |
| 9,478,798 B2 | 9/2016 | Lu et al. | |
| 9,531,002 B2 | 12/2016 | Lu et al. | |
| 9,595,706 B2 | 3/2017 | Lu et al. | |
| 9,608,268 B2 | 3/2017 | Lu et al. | |
| 9,660,268 B2 | 5/2017 | Song et al. | |
| 9,680,152 B2 | 6/2017 | Lu et al. | |
| 10,892,473 B2 | 1/2021 | Wang et al. | |
| 2015/0263325 A1* | 9/2015 | Honda | H01M 50/457 429/144 |
| 2016/0056467 A1* | 2/2016 | Song | H01M 50/411 29/623.3 |
| 2019/0245182 A1* | 8/2019 | Liao | H01M 50/411 |
| 2021/0167375 A1 | 6/2021 | Huang et al. | |
| 2021/0336258 A1 | 10/2021 | Liu et al. | |
| 2021/0336262 A1 | 10/2021 | Liu et al. | |

FOREIGN PATENT DOCUMENTS

| | | | |
|---|---|---|---|
| DE | 10 2013 018 235 | * | 4/2015 |
| FR | 2 955 974 | * | 8/2011 |

OTHER PUBLICATIONS

Gogia, A., Wang, Y., Rai, A.K., Bhattacharya, R., Subramanyam, G., Kumar, J.-Binder-Free, Thin-Film Ceramic-Coated Separators for Improved Safety of Lithium-Ion Batteries, ACS Omega 2021, 6, pp. 4204-4211, publsihed on Feb. 3, 2021 (Year: 2021).*
Machine translation of DE 10 2013 018 235A1, published on Apr. 30, 2015 (Year: 2015).*

* cited by examiner

*Primary Examiner* — Anca Eoff
(74) *Attorney, Agent, or Firm* — Patent Law Offices of Michael E. Woods; Michael Woods

(57) ABSTRACT

An electrochemical cell having one or more electrodes with TMCCC materials introduces improved performance by including a special separator having ceramics and/or a discrete multilayer construction. TMCCC materials with no surface modifications, and existing electrolytes with no composition modifications are combined with a different grade of separator to improve cell performance.

14 Claims, 11 Drawing Sheets

US 11,728,548 B1

SEPARATOR FOR ELECTROCHEMICAL CELL

FIELD OF THE INVENTION

The present invention relates generally to electrochemical cells including a coordination compound electrochemically active in one or more electrodes, and more specifically, but not exclusively, for example wherein one or more electrodes include one or more transition metal cyanide coordination compounds; and even more specifically, but not exclusively, to an improvement in such an electrochemical cell, including a separator material having one or more ceramic species.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electrochemical cells may include transition metal cyanide coordination compound (TMCCC) electrode materials and porous separators that act as a barrier to an electric short circuit between the two electrodes of the cell. Less well-described is the composition of matter of these separators used with TMCCC-containing electrodes. TMCCC electrode materials and other electrode materials are known to have degradation modes including (but not limited to) release of chemical species into the cell's liquid electrolyte, such as dissolved transition metal cations, or water, or other species. Possible solutions to these problems include modifications of the surface of those electrode materials with protective coatings, as well as modifications to the composition of liquid electrolytes to suppress release of such chemical species. Surface coating may limit charge transfer, and therefore charge and discharge rates. Similarly, electrolyte compositions that suppress release of chemical species may not have other properties desirable for high cell performance, such as high ionic conductivity or low viscosity.

Electrochemical cells are designed such that two electrodes are separated by a separator that electronically insulates the two electrodes while also being ionically conductive to allow ions to diffuse between the electrodes and participate in electrochemical reactions. An example of such an electrochemical cell is a lithium-ion cell. Common separator materials used in the lithium-ion chemistry include polyolefin membranes that may or may not contain ceramic species. The separator plays a key role in the electrochemical cell, and its characteristics can impact cell performance in various ways. Examples of how separator characteristics may impact cell performance are outlined in the following paragraphs.

Physical properties such as the thickness of the separator used in an electrochemical cell can affect the nature of a pathway that ions must travel from one electrode to the other. This in turn can influence overall cell impedance and therefore affect a cell's rate capability. It is well known in the lithium-ion battery community that the thermal properties of the separator can influence the reliability of a separator to electronically insulate the two electrodes in an electrochemical cell, and this is important to maintain safe operation of a cell. For example, when the separator readily shrinks or melts upon exposure to heat, electronic insulation between the two electrodes may be lost, causing a short-circuit event, which can lead to thermal runaway and finally to dangerous and costly fire events.

A common way to ameliorate this safety risk is to have a three-layered polyolefin separator, where the inner layer is made with polyethylene and the outer layers are made of polypropylene. In the event of sufficient heat exposure, the polyethylene will melt and close its pores to block both ionic and electrical contact between the energized electrodes. At the same time, the polypropylene layers, which have a higher melting temperature than polyethylene, will maintain their dimensional stability and prevent the entire separator layer from significant shrinking or melting. In the context of a lithium-ion cell, some separators may contain ceramic species which are more dimensionally stable under a wider temperature range, and can be favorable for improving reliable safe operation. This is attributed to a higher thermal capacity of those ceramic species when compared to polyolefin materials.

A favorable separator has a composition that is chemically and electrochemically compatible with the chemistry of the electrochemical cell. For example, a separator that contains ceramic species may have a non-zero water content due to the hygroscopic nature of ceramic materials. When not dried properly, a separator may introduce water into the electrochemical cell; the water can then participate in parasitic reactions in the electrochemical cell, such as electrolytic decomposition of water into hydrogen and oxygen, thereby causing cell performance loss. As such, the chemical composition and physical properties of the separator can influence electrochemical cell impedance, safe operation of the cell, and the rate of cell performance loss.

A separator may influence the electrochemical cell characteristics in different ways depending on the specific chemistry within the electrochemical cell. As such, it is important to consider the effects of separator characteristics on battery cell performance for each unique cell chemistry. In other words, the elements of an electrochemical cell, such as any separator, are strongly influenced by the other components. A separator that is optimized in a context of a lithium-ion or sodium-ion electrochemical cell may be inappropriate or ineffective and, in extreme cases, detrimental or dangerous for use in an electrochemical cell employing electrodes containing TMCCC materials.

Some materials used as an electrode in an electrochemical cell may include TMCCC-containing components which have different characteristics, affinities, considerations, and strengths requiring different separator materials and construction than used in other electrochemistry.

Discussions of a structure and arrangement of electrochemical cells often do not detail any preferred or specific composition for a separator, particularly in combination with TMCCC-containing electrodes. Details, when present, may include generalized discussions of "polymeric, gel, or solid" or "polyethylene, polypropylene, or high melting temperature" separators in a context of electrochemical cells including TMCCC-containing electrodes.

In other contexts, the state of the art may fail to appreciate any particular advantage or concern regarding separator materials and compositions. It is not uncommon for some discussions to assert that no special restriction or consideration is applicable to selection of a separator, particularly for non-TMCCC-containing (e.g., sodium-ion) electrodes and that any known porous separator with electrochemical and chemical stability would be appropriate. Without an appreciation of a range of considerations unique to each electrochemistry model, discussions in the context of non-TMCCC-containing electrodes using separators for a different electrochemistry suggest that certain viable compositions for a separator may be undesirable or unworkable when applied to TMCCC-containing electrodes and electrochemistry even while extolling advantages in a context of a non-TMCCC-containing electrochemical cell. This reflects the unpredictable nature of the special combinations and permutations of the materials and structures that are available across the entire range of secondary electrochemical cells. It is uncertain and unpredictable how an isolated feature from one type of electrochemical cell will interact with other components of an electrochemical cell employing a different electrochemistry.

Separator Considerations:

Thinner separators generally result in lower internal resistance for an electrochemical cell, and therefore may realize a higher energy efficiency and power, as well as providing a higher energy density. A thinner separator may pose a quality and safety hazard because very thin separators may have manufacturing defects (e.g., holes) that results in a short circuiting of two electrodes.

In contrast, thicker separators generally result in higher resistance, lower efficiency and power, and in lower energy density. They have an advantage is that they are generally considered safer because of a reduced risk of any short circuiting of the electrodes.

A porosity of a separator is the fraction of its total volume comprised by its pores, rather than solid matter. More pore volume means more volume for the liquid electrolyte, which correlates with higher ionic conductivity through the separator. The pores themselves may present paths through the separator that are relatively linear, or the path may be quite branching and tortuous. As the path becomes more tortuous, the resulting tortuosity of the pore-defined path may also impact the ionic conductivity through the separator.

Conversely, when a chemical species at one electrode could diffuse to the other electrode and cause a harmful chemical reaction, more tortuous pores and/or a lower pore volume (and a greater thickness) would potentially delay or suppress that harmful reaction.

A composition of the separator is important for several reasons including that the separator be chemically compatible with other components of the electrochemical cell. For example, a polymer component of the separator should not dissolve in the electrolyte solvents. When the electrochemical cell performance is sensitive to moisture, it may be desirable that the separator be dry, or in some cases, have an ability to absorb water from other components of the electrochemical cell. Furthermore, the separator may desirably have thermally stability and not undergo chemical reactions or mechanical changes when the electrochemical cell heats up.

For electrochemical cells containing TMCCC electrodes in particular, an amount of water in the cell may have a surprisingly strong impact on cell performance. In this context, a cell that combines a TMCCC electrode with a separator that is either extremely dry or even hygroscopic (able to absorb water) is potentially desirable, as long as other conditions are satisfied.

Generally speaking, ceramic materials such as alumina ($Al_2O_3$), silica ($SiO_2$), or hydroxides or oxyhydroxides of either aluminum or silicon are used in separators to enhance their thermal stability. A general consideration is that many polymers shrink when heated, so a purely polymer separator might shrink as the cell heats up, resulting in a dangerous short circuit. Instead, these ceramics are thermally stable and do not deform mechanically with heating, so their presence is believed to help prevent a short circuit by providing structural stability.

Surprisingly, use of a set of ceramic components in a separator serves a different purpose in combination with an electrochemical cell including a TMCCC-containing electrode, with inclusion of ceramic components in a separator as described herein results in an increase in the cycle life. These unexpected and useful features have been demonstrated to be reproducible as evidenced herein, offering advantages that have not been previously described or suggested.

What may be beneficial is a system and method for improving performance of an electrochemical cell having one or more electrodes with TMCCC materials by including a separator having ceramics.

BRIEF SUMMARY OF THE INVENTION

Disclosed is a system and method for improving performance of an electrochemical cell having one or more electrodes with TMCCC materials by including a special separator having ceramics and/or a discrete multilayer construction. The following summary of the invention is provided to facilitate an understanding of some of the technical features related to managing water content of electrolytes and of electrodes including TMCCC materials, and is not intended to be a full description of the present invention. A full appreciation of the various aspects of the invention can be gained by taking the entire specification, claims, drawings, and abstract as a whole. The present invention is applicable to other electrochemically active coordination compounds in addition to TMCCC materials.

An embodiment offers a novel solution by which existing TMCCC materials with no surface modifications, and existing electrolytes with no composition modifications are combined with a different grade of separator to improve cell performance.

Embodiments of the present invention may involve a combination of known, commercially available grades of porous separators with new TMCCC electrode material and electrolyte compositions so that the desirable performance characteristics of those electrodes and electrolytes may be better optimized. For example, selection of a separator grade having the proper physical design and chemical composition may result in a significant extension of the cycle calendar life of the electrochemical cell, which is desirable for applications requiring repeated use (charge and discharge) of the cell.

An embodiment of the present invention includes a secondary electrochemical cell having one or more TMCCC electrodes with: (a) a separator that has a composition including a ceramic component; (b) a separator that has a design including discrete layers of polymers and ceramic components; (c) a separator having a ceramic component that includes nanoparticles (<100 nm in size); and/or (d) a separator having a ceramic component that includes more than a certain mass loading (mass per area) such as more than 1 g per square meter.

An embodiment includes an electrochemical cell, including a first electrode; a second electrode; a liquid electrolyte disposed in electrochemical communication with the electrodes; and a separator disposed in the liquid electrolyte and between the electrodes, the separator including a ceramic composition; wherein one of the electrodes includes a coordination compound.

A further embodiment includes the electrochemical cell wherein the ceramic composition includes a material identifying as $M_xO_yH_z$, with x, y, z identifying quantities of a metal (M), oxygen (O), and hydrogen (H). A still further embodiment includes the electrochemical cell wherein M includes at least one of aluminum or silicon.

Another embodiment for the electrochemical cell wherein the coordination compound includes a transition metal cyanide coordination compound identified by Formula I, by AaPb[R(CN)6]c(H2O)n wherein wherein A identifies as one or more alkali cations and P and R each represent one or more divalent or trivalent transition metal cations; wherein 0.5<c<1; wherein a, b, and c are related based on electrical neutrality, a>0, b>0, c>0; and wherein n=6*(1−z)+d, and wherein n>0; wherein 6*(1−z) identifies as a quantity of lattice bound water and d identifies as a quantity of non-coordinated water; wherein d>0; wherein 0<a<2, and b=1.

An embodiment for an electrochemical cell includes a first electrode; a second electrode; a liquid electrolyte disposed in electrochemical communication with said electrodes; and a separator disposed in said liquid electrolyte and between said electrodes, said separator including a ceramic composition; wherein one of said electrodes includes a coordination compound. This electrochemical cell may include a ceramic composition having a material identifying as $M_xO_yH_z$, with x, y, z identifying quantities of a metal (M), oxygen (O), and hydrogen (H). This electrochemical cell may include M having at least one of aluminum or silicon. One or more of these ceramic composition embodiments may include ceramic particles having sizes <100 nm and/or provide a separator having two or more discrete layers, including a first layer consisting essentially of one or more polymers, and a second layer consisting essentially of a ceramic composition.

Another embodiment for an electrochemical cell, includes a first electrode; a second electrode; a liquid electrolyte disposed in electrochemical communication with said electrodes; and a separator disposed in said liquid electrolyte and between said electrodes, said separator including a multilayer construction; wherein one of said electrodes includes a coordination compound.

An embodiment may provide a method for manufacturing an electrochemical cell, including producing a first electrode including a coordination compound; producing a second electrode; producing a liquid electrolyte; producing a separator, said separator including a ceramic composition; and assembling the electrochemical cell including electrochemically communicating said electrodes to said liquid electrolyte and disposing said separator between said electrodes.

Another embodiment may provide a method for manufacturing an electrochemical cell, including producing a first electrode including a coordination compound; producing a second electrode; producing a liquid electrolyte; producing a separator, said separator including a discrete multilayer composition; and assembling the electrochemical cell including electrochemically communicating said electrodes to said liquid electrolyte and disposing said separator between said electrodes.

An embodiment includes a separator configured for use with one or more TMCCC-containing electrodes in a secondary electrochemical cell. This separator includes a set of features, including one or more of ceramics and/or a special multilayer construction.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
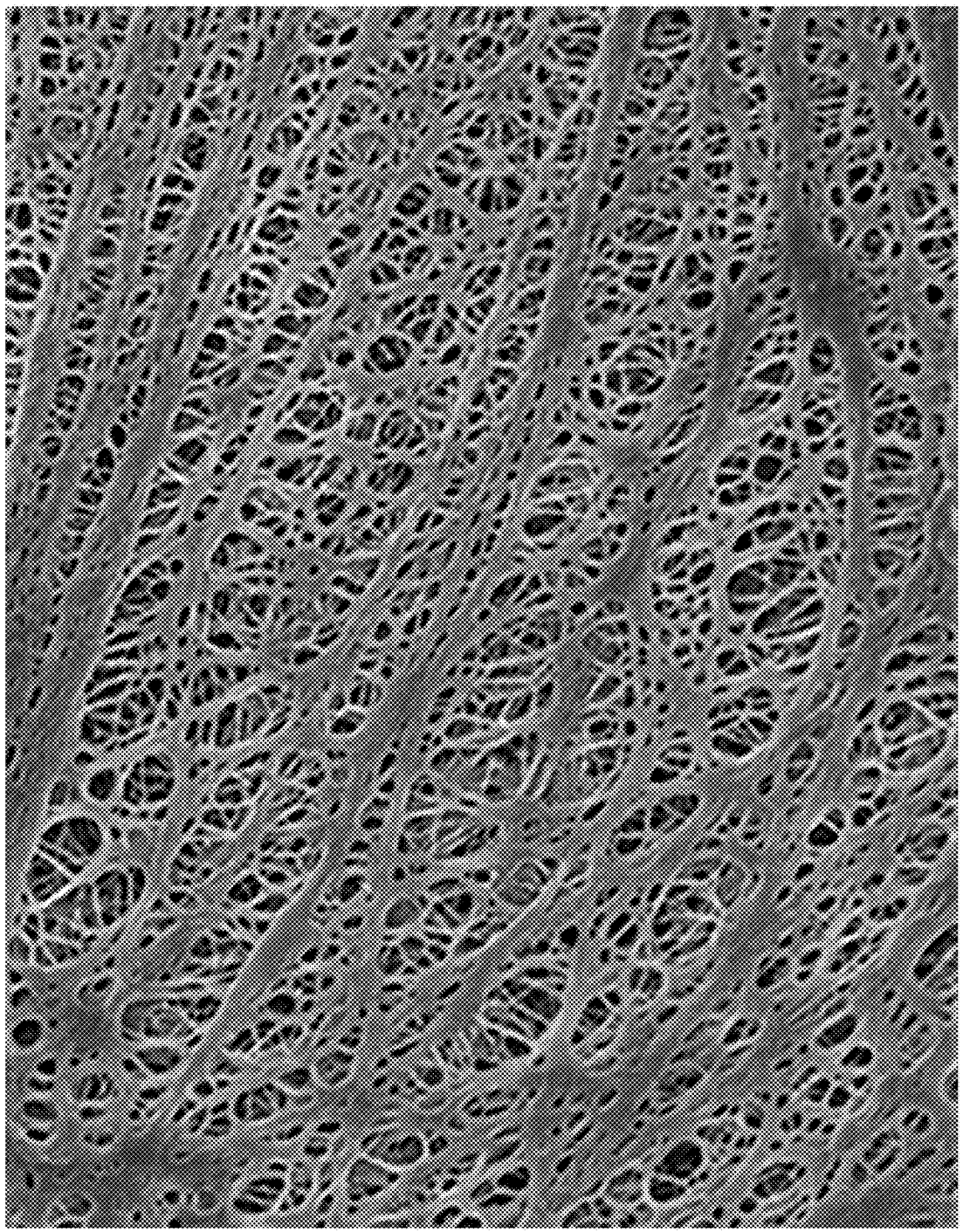
FIG. 1 illustrates a scanning electron microscopy (SEM) image of a wet-processed polyethylene separator surface.

Embodiments of the present invention provide a system and method optimizing electrochemical cell manufacturing by reducing commercialization costs, including reduction of electrolyte costs used in their manufacturing. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to certain embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "coordination compound" includes a material including one or more coordination complexes.

As used herein, the term "residual water content" of a coordination compound, particularly a TMCCC material, refers to a total water content of the TMCCC. Residual water content includes a total water mass divided by a total dry mass of the TMCCC material (the mass of the metals, CN groups, and any other chemical species such as chelating species). For example, in the case of a TMCCC with a dry mass of 100 g and a total water content of 10 g, then the residual water content is calculated as 10 g water/100 g dry mass=10%.

As used herein, a water content of a class of coordination compound materials is a complex topic and refers to a hybrid residual water state which identifies a coordinated water content (e.g., coordinated water) and a non-coordinated water content (e.g., non-coordinated water). Non-coordinated water may be present in various ways, primarily as interstitial water and/or water bound to surfaces of particles of the coordination compound materials and/or water present in any pores or micropores within a TMCCC particle. As used herein, "coordinated water" is meant as an abbreviated term for "transition metal-coordinated water" and, as such, specifically describes water molecules that coordinate to transition metal atoms, and not to alkali metal ions. While the interaction between water and alkali metal ions could generally also be understood as "coordinated", water molecules that interact with alkali ions and not with transition metal atoms are considered herein, due to their relatively weak interaction, as belonging to the category of non-coordinated water. Coordinated water molecules are strongly bound to transition metal atoms that are deficient in cyanide ligands; therefore, coordinated water is considered essential for stabilizing TMCCC materials. Non-coordinated water above a threshold included in an optimally selected residual water content would be considered an undesired impurity that degrades the desired electrochemical properties. However, removing all non-coordinated water may result in poor alkali cation mobility in the TMCCC material, leading to diminished cell energy available for high-power discharge, with only marginal improvement of cycle or calendar life of the cell. Therefore, in addition to coordinated water, a certain amount of non-coordinated water is also necessary and desired. As discussed herein, absent sufficient care, water management processes (e.g., drying) may not sufficiently distinguish between coordinated and non-coordinated water in a compound coordination material. Coordination compound materials discussed herein may be used in a system including a water-containing electrolyte which may influence the water content of the coordination compound material after assembly or during use. A coordination compound having its residual water adjusted to a desired non-degrading water content range is referred to herein as a water mediated coordination compound material. Similarly, a coordination compound having its residual water outside this range is referred to herein as a water non-mediated coordination compound material.

As used herein, the term "aqueous" in the context of an electrolyte for an electrochemical cell means an electrolyte including water as a solvent and one or more dissolved materials with the water solvent having a concentration greater than 5%.

As used herein, the term "non-aqueous" in the context of an electrolyte for an electrochemical cell means an electrolyte including a solvent other than water, with either no water being present or water having a concentration less than 5%.

As used herein, the term "anhydrous" in the context of an electrolyte for an electrochemical cell means an electrolyte including a solvent other than water, water as a trace impurity having a concentration less than 0.01%.

As used herein, the term "drying" in the context of removal of water from a material, refers to removal of water to the greatest degree possible consistent with the drying process leaving water as a trace impurity at a concentration limited by the drying process actually used. Drying changes a material to an anhydrous state (therefore a dried material is an anhydrous material).

As used herein, the term "dehydrating" in the context of modifying a concentration of water in a material, refers to controllably reducing the water content to a desired level greater than a trace impurity. In contrast to drying, dehydrating contemplates retaining water as necessary desirable component of the material, for example, retaining all coordinated water and retaining a certain residual content of non-coordinated water.

As used herein, the term "hydrating" in the context of modifying a concentration of water in a material, refers to controllably increasing the water content to a desired level greater than a trace impurity, within target ranges needed for optimal performance and calendar life of an electrochemical cell.

As used herein, the term "mediating" in the context of modifying a concentration of water content in a coordination compound such as a TMCCC material includes dehydrating or hydrating the material to achieve a desired coordinated water concentration that enables the desired electrochemical properties. One way to consider water content quantity mediation is consideration of a mass fraction of water of a TMCCC material, including non-coordinated and coordinated water, both before and after mediation.

As used herein, a "grade" of a separator may reference an important characteristic such as a thickness, number of laminated layers, and the like. For a separator including a ceramic component as further described herein, a grade may refer to a size of individual ceramic particles, a relative thickness of a layer including ceramic elements versus another non-ceramic layer of that separator, for example a layer including polymer-only components, or other physical characteristic. In some instances, a grade may refer to chemical attributes such as a composition of the ceramic.

As used herein, the term "ceramic" in the context of a separator used in a secondary electrochemical cell includes a class of materials identifying generally by a chemical formula: $M_xO_yH_z$, with x, y, z identifying quantities of a metal (M), oxygen (O), and hydrogen (H). Preferably, M includes at least one of aluminum or silicon though in other embodiments a ceramic may include one or more metal oxides including alkaline earth oxides and transition metal oxides.

As used herein, a coordination complex includes a central atom or ion, which is usually metallic and is called the coordination center, and a surrounding array of bound molecules or ions, that are in turn known as ligands or complexing agents. Many metal-containing compounds, especially those that include transition metals (elements like titanium), are coordination complexes. A specific type of coordination compound, a transition metal cyanide coordination compound identified by $A_xP_y[R(CN)_6]_z(H_2O)_n$, wherein wherein A identifies as one or more alkali cations and P and R each represent one or more divalent or trivalent transition metal cations; wherein $0.5<z<1$; wherein x, y, and z are related based on electrical neutrality, $x>0$, $y>0$, $z>0$; and wherein $n=6*(1-z)+m$, and wherein $n>0$; wherein $6*(1-z)$ identifies as a quantity of lattice bound water and m identifies as a quantity of non-coordinated water; wherein $m\geq0$; wherein $0\leq x\leq2$, and $y=1$.

An embodiment includes an electrochemical cell having a first electrode, a second electrode, a liquid electrolyte disposed in electrochemical communication with the electrodes, and a separator disposed in the liquid electrolyte and between the electrodes, the separator including a ceramic composition, wherein one of the electrodes includes a coordination compound.

The general procedure used to fabricate a TMCCC electrochemical cell consists of several steps and will be outlined in the following paragraphs. The first step is to fabricate individual electrode sheets. A slurry containing one or more TMCCC active material powders, a small amount of one or more polymer binder species and a small amount of one or more carbon additive species is mixed into one or more organic solvents to produce a homogeneous mixture. The mixture is then cast at a constant thickness onto an aluminum current collector, resulting in a thin coating layer of the slurry on the current collector surface. The organic solvent is then driven out of the thin coating layer via evaporation, resulting in a solid electrode composite adhered to the current collector, with a thickness of less than 200 microns. The electrode sheet is then calendered to a desired thickness in order to control the electrode composite porosity. The same general procedure for fabricating electrodes is employed for both anode and cathode electrodes. For the following examples, sodium manganese-iron hexacyanoferrate was used as the TMCCC cathode active material and sodium manganese hexacyanomanganate was used as the TMCCC anode active material.

The next step is to assemble the electrochemical cell. Anode and cathode electrodes are punched into coupons where each coupon has an area of bare aluminum to serve as the electrical contact to the electrode. The cell is assembled by first laying down a cathode electrode, then laying down a commercially available separator onto the cathode electrode composite, and then laying down an anode electrode on top of the separator. This process can be repeated multiple times to create a multi-layer cell stack. The separator area is slightly oversized compared to the anode and cathode electrode areas, to ensure proper insulation between electrodes. The stack is taped together around the outside of the cell stack. Aluminum tabs are welded to the bare aluminum areas on the electrode coupons. The cell stack is then placed into a mylar-coated aluminum pouch and the pouch is sealed on three sides, where the aluminum tabs protrude from one edge of the pouch. An acetonitrile-based electrolyte is then added into the pouch at a volume in slight excess of the cell stack's total pore volume. After allowing the electrolyte to wet the cell stack, the pouch is vacuum-sealed, thus producing the fully assembled electrochemical pouch cell. All examples listed herein use this general procedure to create one of two types of cells: a two-layer cell with nominal capacity 24 mAh, or a multi-layer cell with nominal capacity 4 Ah. The steps used to produce such a cell from the components includes may be performed in other orders, and some steps may be excluded from the procedure, or some additional processing steps may be introduced in addition to those described herein.

For each TMCCC material, electrodes were prepared by mixing the active material powder with carbon black and either a polyvinylidene difluoride binder in a solvent of n-methyl pyrrolidinone, or a styrene-butadiene copolymer binder in a solution of butanol and xylenes. The electrodes were prepared with a mass ratio of 8:1:1 active material powder, carbon black, and binder. The resulting slurry was spread on a substrate made of either carbon felt or carbon coated aluminum foil and then dried in a vacuum oven at a temperature of approximately 100° C. Variations of this electrode preparation process may be used to achieve enhanced electrode performance. These variations may include selection of various conductive carbons or combinations of conductive carbons including but not limited to carbon black, graphite, or hard carbon, or selection of various binders or combinations of binders including but not limited to vinylfluoride/hexafluoropropylene copolymer, polyvinylidenefluoride (PVDF), polyacrylonitrile, polymethylmethacrylate, polytetrafluoroethylene, or styrene butadiene rubber-based polymer. Variations of this electrode preparation process may also include the temperature, duration, and pressure during electrode drying.

Each of these TMCCC electrodes may be combined with other counter electrodes capable of undergoing an electrochemical reaction at higher or lower potential to produce a cell having non-zero voltage. Counter electrodes may include sodium-ion electrodes such as TMCCC cathodes, layered transition metal oxides such as sodium manganese oxide, transition metal phosphates such as sodium vanadium phosphate, other ceramic electrodes containing electrochemically active transition metals, metals capable of alloying with sodium, including tin, antimony, and lead, and carbons including graphitic, hard, or soft carbons. Counter electrodes may also include electrodes that undergo an electrochemical reaction with a cation different from sodium, such as lithium or potassium, including lithium-ion electrode materials including layered oxides such as lithium cobalt oxide, transition metal phosphates such as lithium iron phosphate, alloys capable of undergoing reactions with lithium, such as silicon, and carbons including graphite.

Each of these TMCCC electrodes may further be combined with other electrolyte solvents and electrolyte salts during cell assembly. Other organic electrolyte solvents that are electrochemically inactive in the operating electrochemical potential range of the TMCCC electrode and the counter electrode may be used in a practical cell. These solvents include nitriles such as succinonitrile or propionitrile, carbonates including propylene carbonate or dimethyl carbonate, sulfones including sulfolane and dimethyl sulfone, sulfoxides including dimethyl sulfoxide, amides including dimethylformamide, ethers including glymes including diglyme, triglyme, tetraglyme, 1,4-dioxane, or 1,3-dioxolane, lactones including gamma-valerolactone, glycol ethers including methylene glycol monoethylether, or other solvents, or a combination thereof. Other electrolyte salts that are soluble in the electrolyte solvent and that are electrochemical inactive in the operating electrochemical potential range of the TMCCC electrode and the counter electrode may be used in a practical cell. These salts may include sodium hexafluorophosphate, sodium tetrafluoroborate, sodium perchlorate, sodium (trifluoromethane)sulfonimide, sodium 4,5-dicyano-2-(trifluoromethyl)imidazolide, or other sodium salts, or a combination thereof. Furthermore, as the TMCCC electrode or its counterelectrode may undergo electrochemical reactions with other cations such as lithium, potassium, or magnesium, these salts may include lithium, potassium, or magnesium salts of tetrafluoroborate, perchlorate, (fluoromethane)sulfonimide, (trifluoromethane) sulfonimide, 4,5-dicyano-2-(trifluoromethyl)imidazolide, or a combination thereof. Furthermore, these TMCCC electrodes may be operated in aqueous electrolytes containing water in a concentration greater than that associated with impurities, such as 2% or more, or in electrolytes including one or more ionic liquids, including but not limited to an ionic liquid including (trifluoromethane)sulfonimide.

Described herein is a particular assembled cell in which a particular grade of separator including a plurality of components has been used to enhance cell performance. This plurality of separator components may include one or more of a polymer component including but not limited to a polyethylene or polypropylene, as well as a ceramic component including but not limited to aluminum oxide, aluminum oxyhydroxide, aluminum hydroxide, silicon dioxide, and oxyhydroxides of silicon, as well as mixed aluminum-silicon oxides and mixed aluminum-silicon oxyhydroxides. Said ceramic component may further include a transition metal oxide or transition metal oxyhydroxide, including but not limited to those including the same transition metals found in one or both of the TMCCC electrodes, or excluding the transition metals found in said electrodes. Said ceramic components may include surface groups that are the same or different from the bulk composition of each ceramic particle comprising that component. For example, in one instance a ceramic component comprising silicon dioxide may also include surface groups comprising silicon hydroxide or silicon oxyhydroxide. Said ceramic components may include water, therefore comprising hydrates of oxide, oxyhydroxide, or hydroxide phases. Said ceramic components may reversibly absorb and release water when dried via processes such as exposure to heat or vacuum. Said ceramic components may alternatively permanently bind absorbed water.

Said polymer components of said separators may include a particular molecular weight. Said polymer components may include a particular porosity comprising a plurality of pores of a particular size, such as less than 10 nanometers, 10-100 nanometers, or 100-1000 nanometers. Said polymer components may include a plurality of polymers blended together into a homogeneous or quasi-homogeneous medium, or may form discrete regions such as discrete layers, each of which may contain one or more of said polymers.

Said ceramic components of said separators may include a particular particle size distribution, such as 10 nanometers, 10-100 nanometers, 100-1000 nanometers, or greater than 1000 nanometers. In some instances, said ceramic components may include particles of multiple sizes, such as particles including sizes in the range of 10-100 nanometers and particles including sizes in the range of greater than 1000 nanometers. Said ceramic particles may be distributed homogeneously or quasi-homogeneously with said polymer components. Said ceramic particles may also form a layer that excludes any polymer components or that includes only a small amount of polymer components, such as 20% or less. Said ceramic particle layers may comprise a multi-layer separator in which a ceramic particle layer is adjacent to a layer containing only polymer components. Furthermore, a separator containing such layers may include three or more layers, each of which may contain only polymer components, primarily ceramic particles excluding polymer components or including only a small amount of polymer components, or both polymer and ceramic components distributed homogeneously or quasi-homogeneously in said layer. In one instance, a separator may contain a single layer containing a homogeneous distribution of polymer components and ceramic particles. In another instance, a separator may contain a first layer comprising only polymer components, and a second layer comprising primarily ceramic particles and a small quantity of ceramic components. In another instance, a separator may contain three layers, with a middle layer comprising only polymer components, and two adjacent layers comprising primarily ceramic particles and a small quantity of ceramic components.

The performance of the battery cell may depend on physical properties of the separator, including but not limited to density, thickness, porosity (percent of total volume comprised by pore volume), pore tortuosity, pore size, and the areal density of pores. The performance of the battery cell may further depend on chemical properties of the separator, including but not limited to its composition, whether or not it contains particular species of polymer components or ceramic components. The performance of the battery cell may further depend on chemical reactions that may occur between the separator and other chemical species in the cell, including but not limited to water that may be present in the cell, said water initially present in the electrolyte, one or more of the electrodes, or another cell component. Said chemical reactions between the separator and water may include absorption of water. Said absorption may be reversible or irreversible. The amount of water absorbed via said chemical reactions may scale proportionally with the mass, surface area, or another quantity representing an amount of ceramic component included in said separator.

An embodiment of the instant invention is a cell containing a separator containing a ceramic component comprising at least 50% of the total mass of the separator. Another embodiment of this invention is a cell containing a separator containing a ceramic component having a mass of at least 1 g per square meter, and up to about 25 g per square meter or more. Another embodiment of the instant invention is a cell containing a separator containing a ceramic component comprising at least 30% of the total volume of the separator, up to about 60% of the total volume of the separator, or more. Another embodiment of the instant invention is a cell containing a separator containing a ceramic component an a polymer component and having a total thickness of at least 5 microns, or at least 10 microns, or at least 25 microns, or at least 50 microns.

Figure 3:
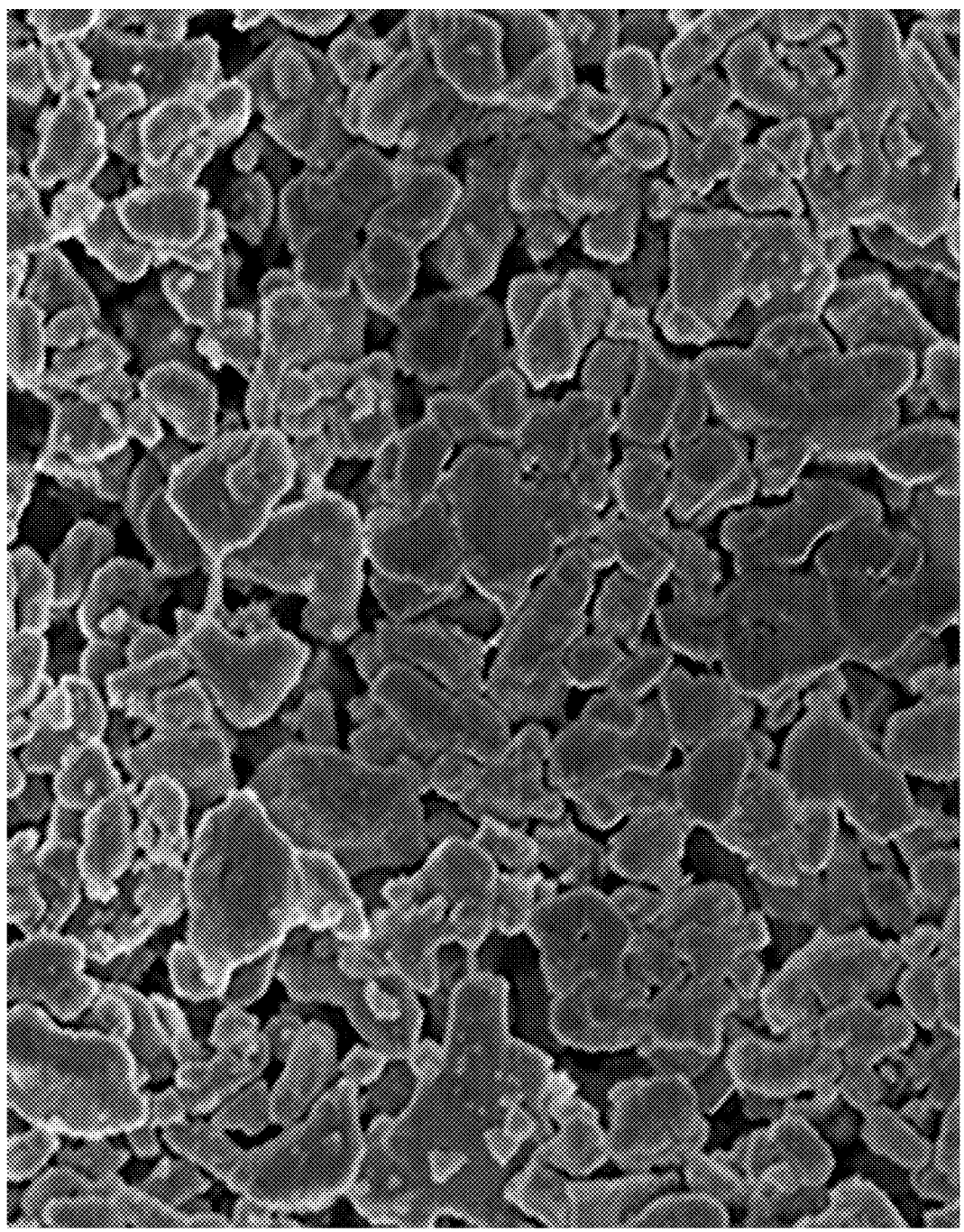
FIG. 3 illustrates an SEM image of a surface of a first alumina-coated separator.

The general procedure used to test the electrochemical performance of the cell consists of continuous cycles of constant-current charging and discharging the cell at a current per limiting electrode active material mass of 66 mA/g. The rate of cell capacity loss describes the electrochemical cell's lifetime performance, where a lower rate of capacity loss is desired. To increase the pace of learning, cells are tested under increased stress conditions including constant voltage holds at the maximum cell voltage and testing at elevated ambient temperature of 55° C. A typical voltage profile for a single charge-discharge cycle at ambient temperature 55° C. is shown in FIG. 3.

EXAMPLES

Example 1. A set of electrochemical cells was fabricated using the general fabrication procedure already described for a two-layer cell with nominal capacity 24 mAh. During cell assembly, a separator of grade #1 having properties as listed in table 1 was used. The rest of the cell fabrication steps were the same as described in the general procedure. The general testing procedure already described was used to assess the lifetime performance of a cell with this composition.

Example 2. A set of electrochemical cells was fabricated using the general fabrication procedure already described for a two-layer cell with nominal capacity 24 mAh. During cell assembly, a separator of grade #2 having properties as listed in table 1 was used. The rest of the cell fabrication steps were the same as described in the general procedure. The general testing procedure already described was used to assess the lifetime performance of a cell with this composition.

Example 3. A set of electrochemical cells was fabricated using the general fabrication procedure already described for a two-layer cell with nominal capacity 24 mAh. During cell assembly, a separator of grade #3 having properties as listed in table 1 was used. The rest of the cell fabrication steps were the same as described in the general procedure. The general testing procedure already described was used to assess the lifetime performance of a cell with this composition.

Example 4. A set of electrochemical cells was fabricated using the general fabrication procedure already described for a two-layer cell with nominal capacity 24 mAh. During cell assembly, a separator of grade #4 having properties as listed in table 1 was used. The rest of the cell fabrication steps were the same as described in the general procedure. The general testing procedure already described was used to assess the lifetime performance of a cell with this composition.

Example 5. A set of electrochemical cells was fabricated using the general fabrication procedure already described for a two-layer cell with nominal capacity 24 mAh. During cell assembly, a separator of grade #5 having properties as listed in table 1 was used. The rest of the cell fabrication steps were the same as described in the general procedure. The general testing procedure already described was used to assess the lifetime performance of a cell with this composition.

Example 6. A set of electrochemical cells was fabricated using the general fabrication procedure already described for a two-layer cell with nominal capacity 24 mAh. During cell assembly, a separator of grade #6 having properties as listed in table 1 was used. The rest of the cell fabrication steps were the same as described in the general procedure. The general testing procedure already described was used to assess the lifetime performance of a cell with this composition.

Example 7. A set of electrochemical cells was fabricated using the general fabrication procedure already described for a two-layer cell with nominal capacity 24 mAh. During cell assembly, a separator of grade #7 having properties as listed in table 1 was used. The rest of the cell fabrication steps were the same as described in the general procedure. The general testing procedure already described was used to assess the lifetime performance of a cell with this composition.

Example 8. A set of electrochemical cells was fabricated using the general fabrication procedure already described for a two-layer cell with nominal capacity 24 mAh. During cell assembly, a separator of grade #8 having properties as listed in table 1 was used. The rest of the cell fabrication steps were the same as described in the general procedure. The general testing procedure already described was used to assess the lifetime performance of a cell with this composition.

Example 9. A set of electrochemical cells was fabricated using the general fabrication procedure already described for a multi-layer cell with nominal capacity 4 Ah. During cell assembly, a separator of grade #8 having properties as listed in table 1 was used. The rest of the cell fabrication steps were the same as described in the general procedure. The general testing procedure already described was used to assess the lifetime performance of a cell with this composition.

Example 10. A set of electrochemical cells was fabricated using the general fabrication procedure already described for a two-layer cell with nominal capacity 24 mAh. During cell assembly, a separator of grade #10 having properties as listed in table 1 was used. The rest of the cell fabrication steps were the same as described in the general procedure. The general testing procedure already described was used to assess the lifetime performance of a cell with this composition.

Example 11. A set of electrochemical cells was fabricated using the general fabrication procedure already described for a two-layer cell with nominal capacity 24 mAh. During cell assembly, a separator of grade #11 having properties as listed in table 1 was used. The rest of the cell fabrication steps were the same as described in the general procedure. The general testing procedure already described was used to assess the lifetime performance of a cell with this composition.

Example 12. A set of electrochemical cells was fabricated using the general fabrication procedure already described for a two-layer cell with nominal capacity 24 mAh. During cell assembly, a separator of grade #12 having properties as listed in table 1 was used. The rest of the cell fabrication steps were the same as described in the general procedure. The general testing procedure already described was used to assess the lifetime performance of a cell with this composition.

Example 13. A set of electrochemical cells was fabricated using the general fabrication procedure already described for a two-layer cell with nominal capacity 24 mAh. During cell assembly, a separator of grade #13 having properties as listed in table 1 was used. The rest of the cell fabrication steps were the same as described in the general procedure. The general testing procedure already described was used to assess the lifetime performance of a cell with this composition.

Example 14. A set of electrochemical cells was fabricated using the general fabrication procedure already described for a two-layer cell with nominal capacity 24 mAh. During cell assembly, a separator of grade #14 having properties as listed in table 1 was used. The rest of the cell fabrication steps were the same as described in the general procedure. The general testing procedure already described was used to assess the lifetime performance of a cell with this composition.

Example 15. A set of electrochemical cells was fabricated using the general fabrication procedure already described for a two-layer cell with nominal capacity 24 mAh. During cell assembly, a separator of grade #15 having properties as listed in table 1 was used. The rest of the cell fabrication steps were the same as described in the general procedure. The general testing procedure already described was used to assess the lifetime performance of a cell with this composition.

Example 16. A set of electrochemical cells was fabricated using the general fabrication procedure already described for a two-layer cell with nominal capacity 4 Ah. During cell assembly, a separator of grade #16 having properties as listed in table 1 was used. The rest of the cell fabrication steps were the same as described in the general procedure. The general testing procedure already described was used to assess the lifetime performance of a cell with this composition.

Table I includes key separator properties of separator grades employed in the examples herein. Base film materials include polyethylene (PE), polypropylene (PP), and/or a tri-layer of polypropylene, polyethylene, and polypropylene (PP/PE/PP).

TABLE I

Outlined Separator Properties

| Separator grade # | Base film material | Base film porosity [%] | Ceramic species | Ceramic particle size | Ceramic loading [g/m2] | Total thickness [um] |
|---|---|---|---|---|---|---|
| 1 | PE | 44 | — | — | 0.0 | 20.0 |
| 2 | PE | 44 | $Al_2O_3$ | nano | 9.0 | 22.0 |
| 3 | PE | 44 | AlOOH | micro | 8.2 | 22.0 |
| 4 | PE | 44 | $SiO_2$ | nano | 5.3 | 22.0 |
| 5 | PE | 49 | — | — | 0.0 | 20.0 |
| 6 | PE | 49 | $Al_2O_3$ | nano | 2.6 | 22.0 |
| 7 | PE | 49 | $Al_2O_3$ | nano | 6.2 | 20.0 |
| 8 | PE | 49 | $Al_2O_3$ | nano | 9.0 | 22.0 |
| 9 | PE | 55 | — | — | 0.0 | 12.0 |
| 10 | PE | 55 | — | — | 0.0 | 20.0 |
| 11 | PE | 55 | $Al_2O_3$ | nano | 5.5 | 16.0 |
| 12 | PP | 52 | — | — | 0.0 | 12.0 |
| 13 | PP/PE/PP | 45 | — | — | 0.0 | 14.0 |
| 14 | PP/PE/PP | 45 | $Al_2O_3$ | micro | 7.0 | 18.0 |
| 15 | PP/PE/PP | 50 | $Al_2O_3$ | micro | 7.0 | 22.5 |

Figure 2:
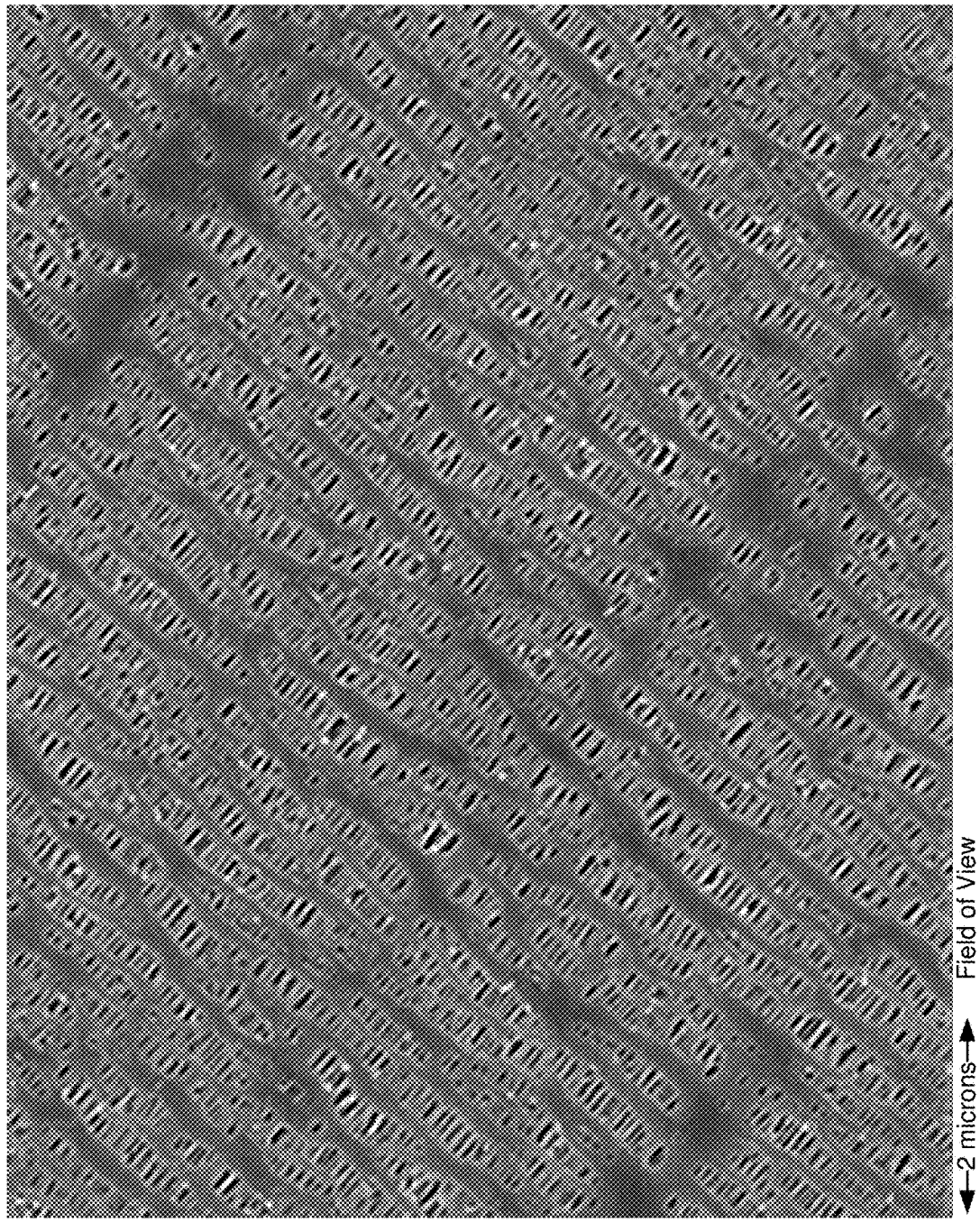
FIG. 2 illustrates an SEM image of a dry-processed polypropylene separator surface.

FIG. 1 illustrates a scanning electron microscopy (SEM) image of a wet-processed polyethylene (PE) separator surface, and FIG. 2 illustrates an SEM image of a dry-processed polypropylene (PP) separator surface.

Figure 4:
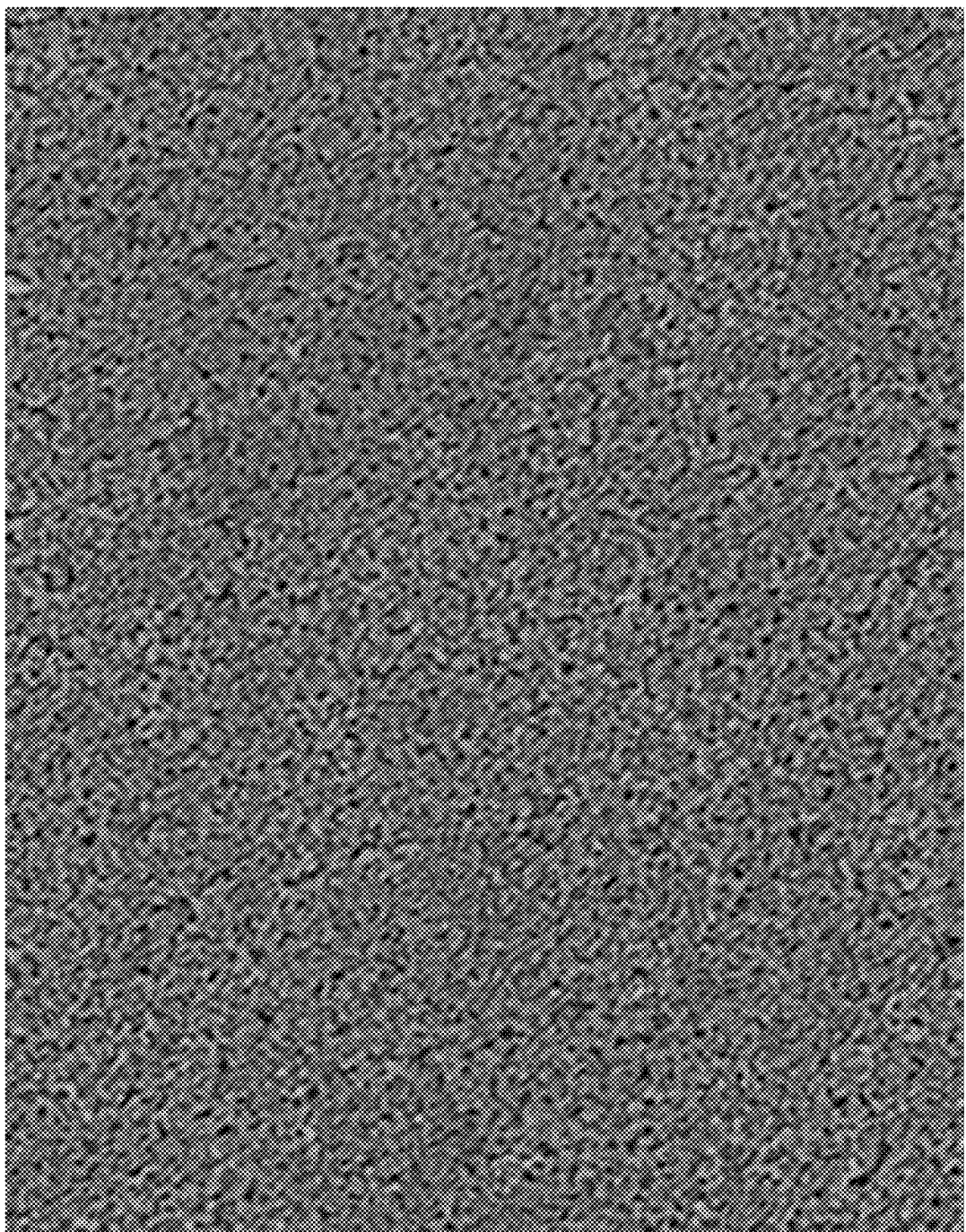
FIG. 4 illustrates an SEM image of a surface of a second alumina-coated separator.

FIG. 3 illustrates an SEM image of a surface of a first alumina-coated separator wherein alumina particles are of a micron size scale (micro scale), FIG. 4 illustrates an SEM image of a surface of a second alumina-coated separator wherein alumina particles are of a nano size scale (nano scale).

Figure 5:
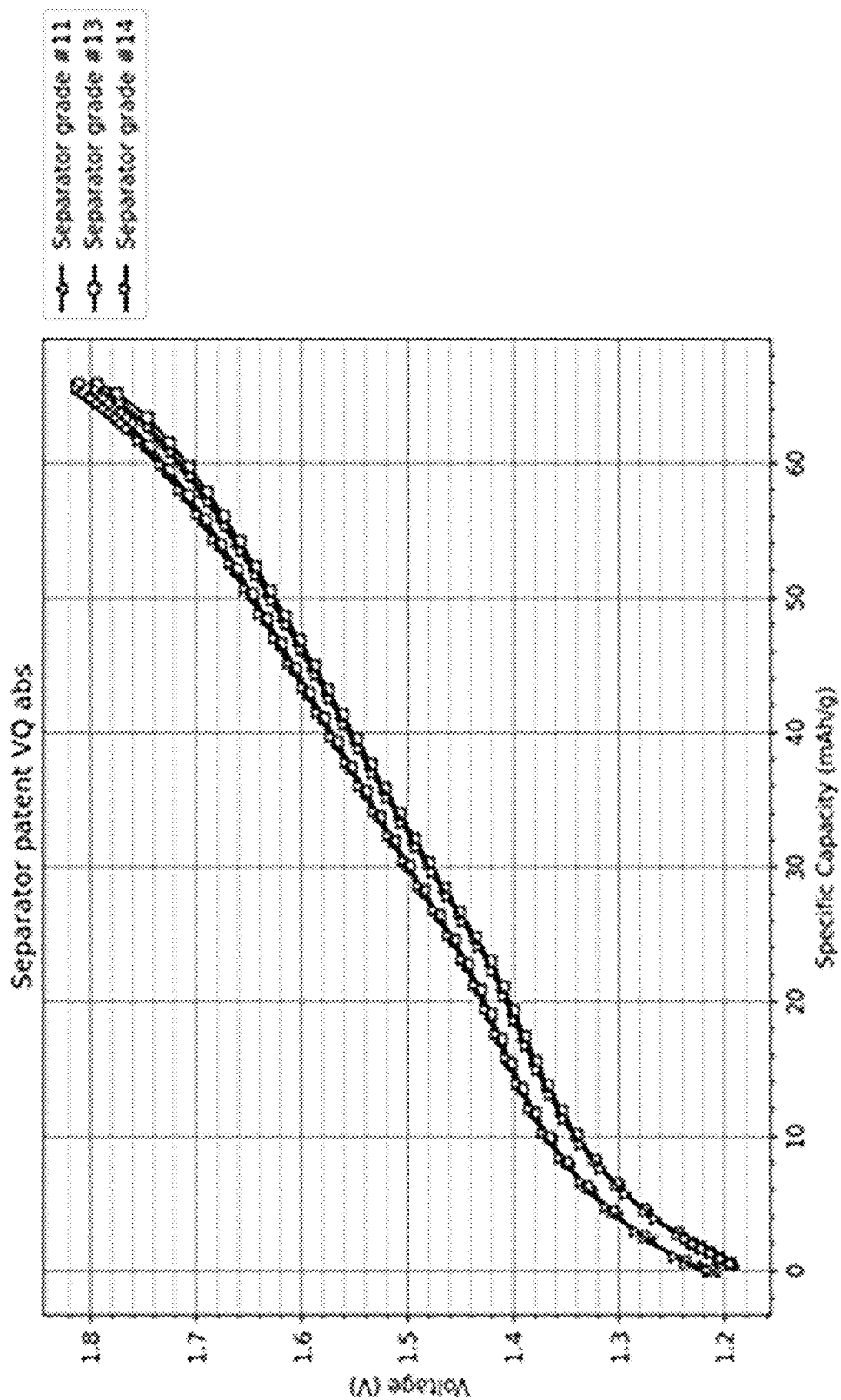
FIG. 5 illustrates a constant-current charge-discharge voltage profile.

FIG. 5 illustrates a constant-current charge-discharge voltage profile at a current per limiting electrode active material mass of 66 mA/g, at an ambient temperature of 55°

C., of a cell containing a sodium manganese iron hexacyanoferrate cathode, a sodium manganese hexacyanomanganate anode, and acetonitrile-based electrolyte, with separator grades #11, 13, 14 described in Table 1.

Figure 6:
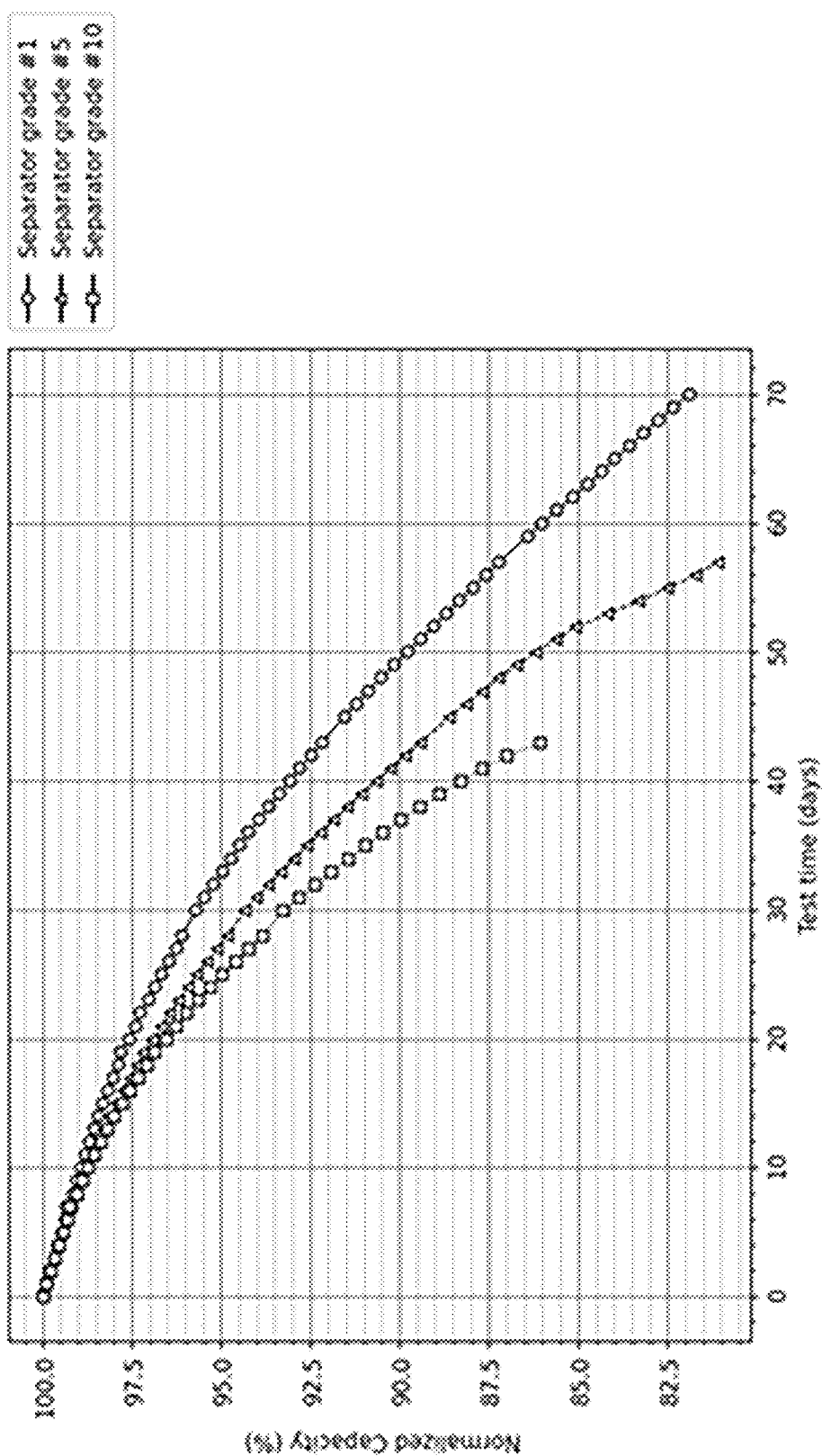
FIG. 6 illustrates a lifetime effect of base film porosity.

FIG. 6 illustrates a lifetime effect of base film porosity including PE separators with constant total thicknesses exhibit monotonically improving lifetime performance with lower porosity.

Figure 7:
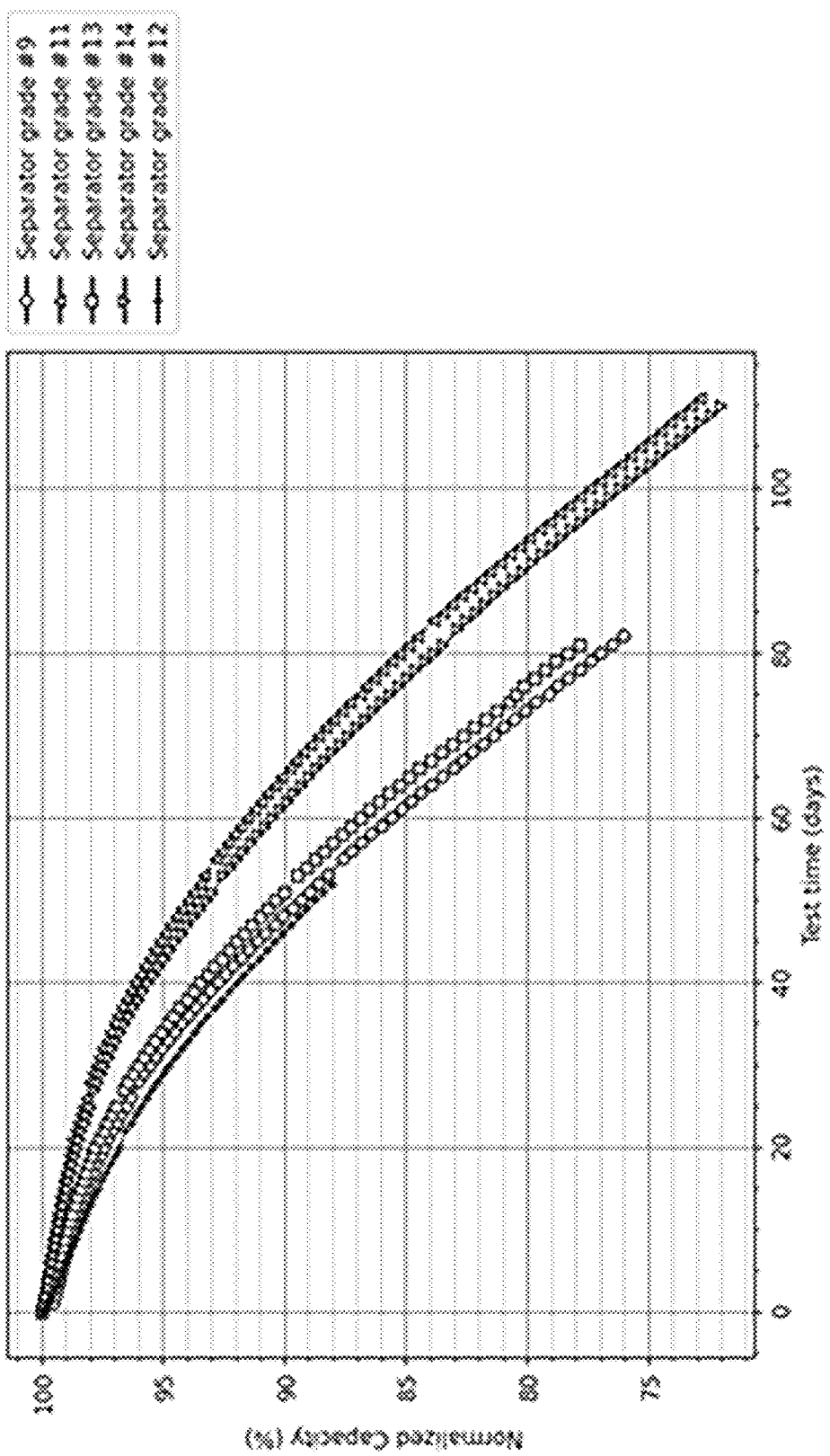
FIG. 7 illustrates a lifetime effect of ceramic coating.

FIG. 7 illustrates a lifetime effect of ceramic coating wherein uncoated PP, PE, and PP/PE/PP separators exhibit inferior performance compared to alumina-coated PE and alumina-coated PP/PE/PP. Note that there may exist other differences between the alumina-coated separators and uncoated separators, such as base film porosities and total thicknesses, however the effect of the alumina-coatings is expected to outweigh the effects of these differences.

Figure 8:
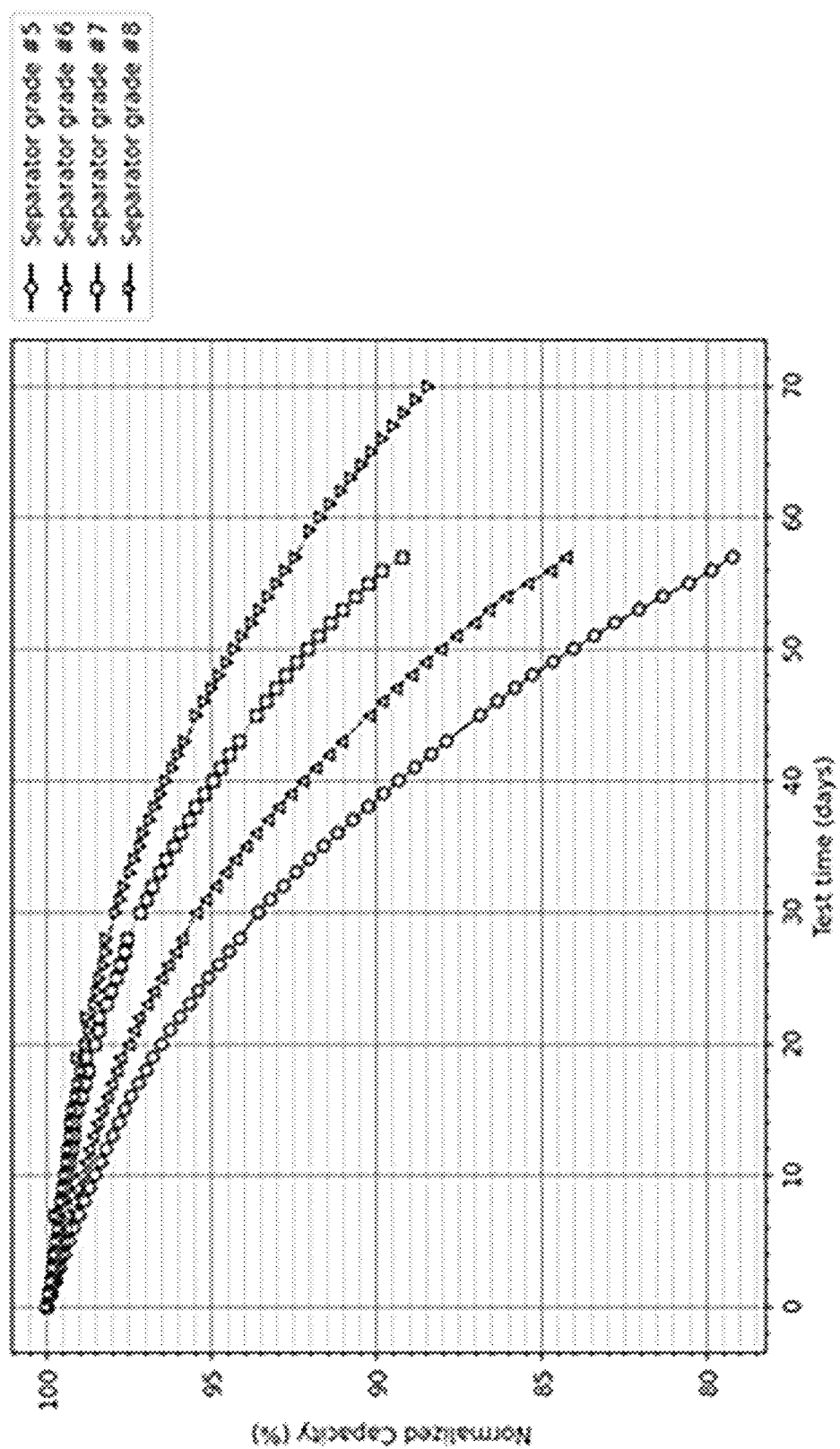
FIG. 8 illustrates a lifetime effect of ceramic loading.

FIG. 8 illustrates a lifetime effect of ceramic loading wherein PE separators with constant base film porosities and total thicknesses exhibit monotonically improving lifetime performance with increasing $Al_2O_3$ mass loading.

Figure 9:
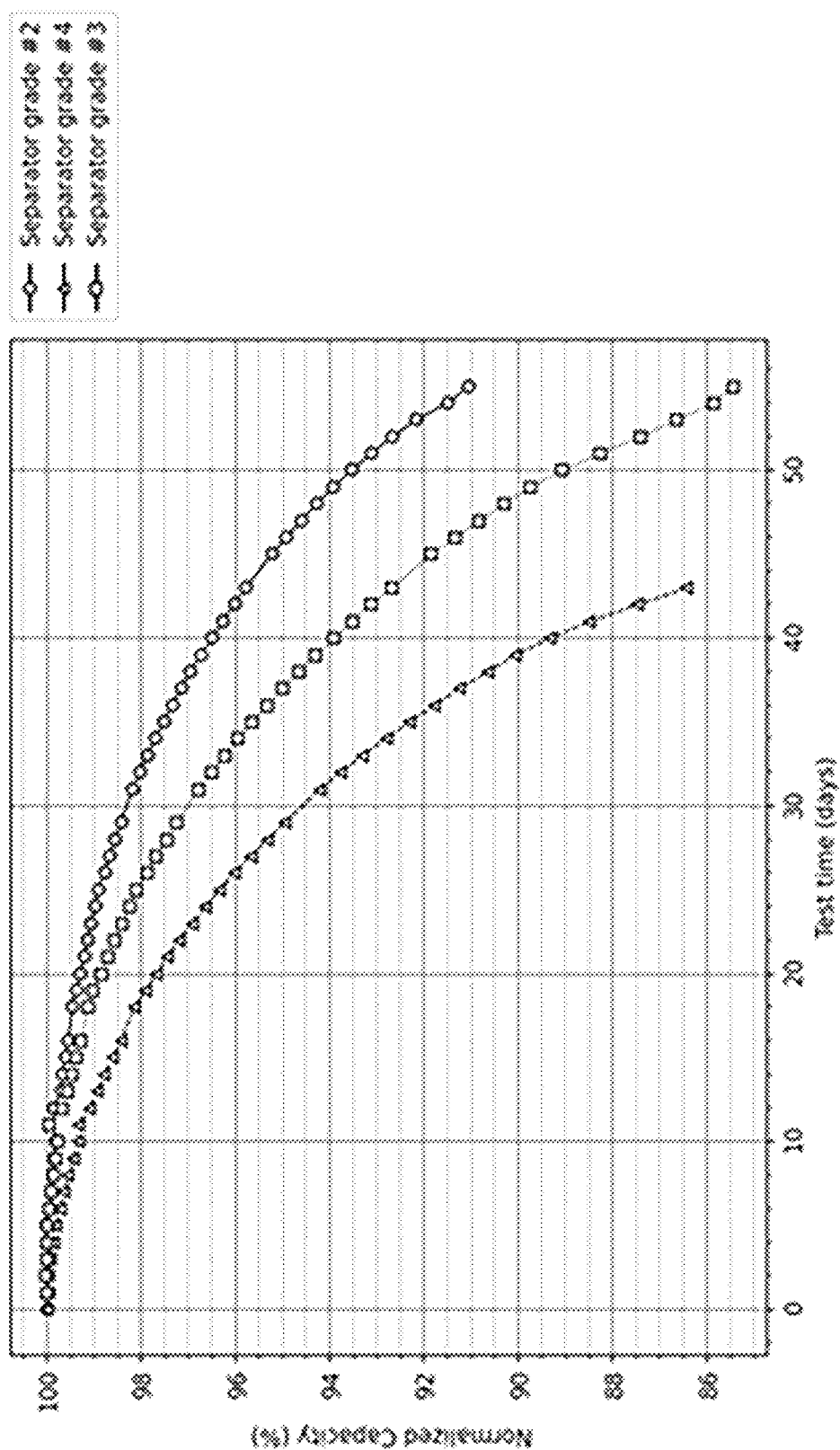
FIG. 9 illustrates a lifetime effect of ceramic species.

FIG. 9 illustrates a lifetime effect of ceramic species wherein $Al_2O_3$-coated PE exhibits superior performance to AlOOH-coated PE, and both are superior to $SiO_2$-coated PE. All ceramic species are coated onto base films of identical compositions. Note that ceramic mass loadings between these separator grades differ due to different densities of the ceramic species. However, the effect of ceramic species is expected to outweigh the effect of mass loadings.

Figure 10:
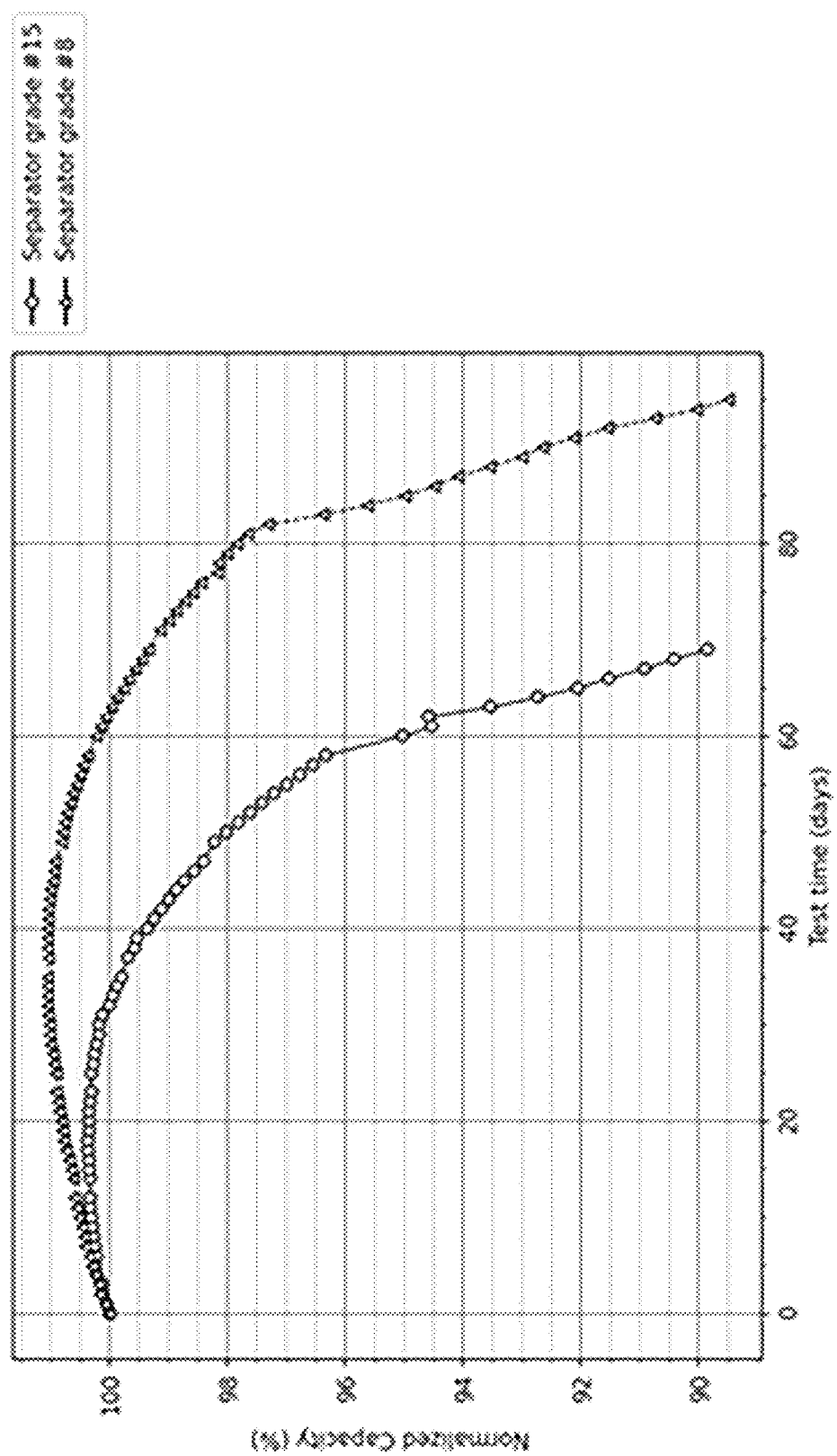
FIG. 10 illustrates a lifetime effect of ceramic particle size.

FIG. 10 illustrates a lifetime effect of ceramic particle size wherein separators coated with nano-$Al_2O_3$ particles exhibit superior lifetime performance when compared to separators coated with micro-$Al_2O_3$ particles. Note that there may exist other differences between these two grades, such as base film materials and ceramic mass loadings, but the effect of the $Al_2O_3$ particle size is expected to outweigh the effects of these differences.

Figure 11:
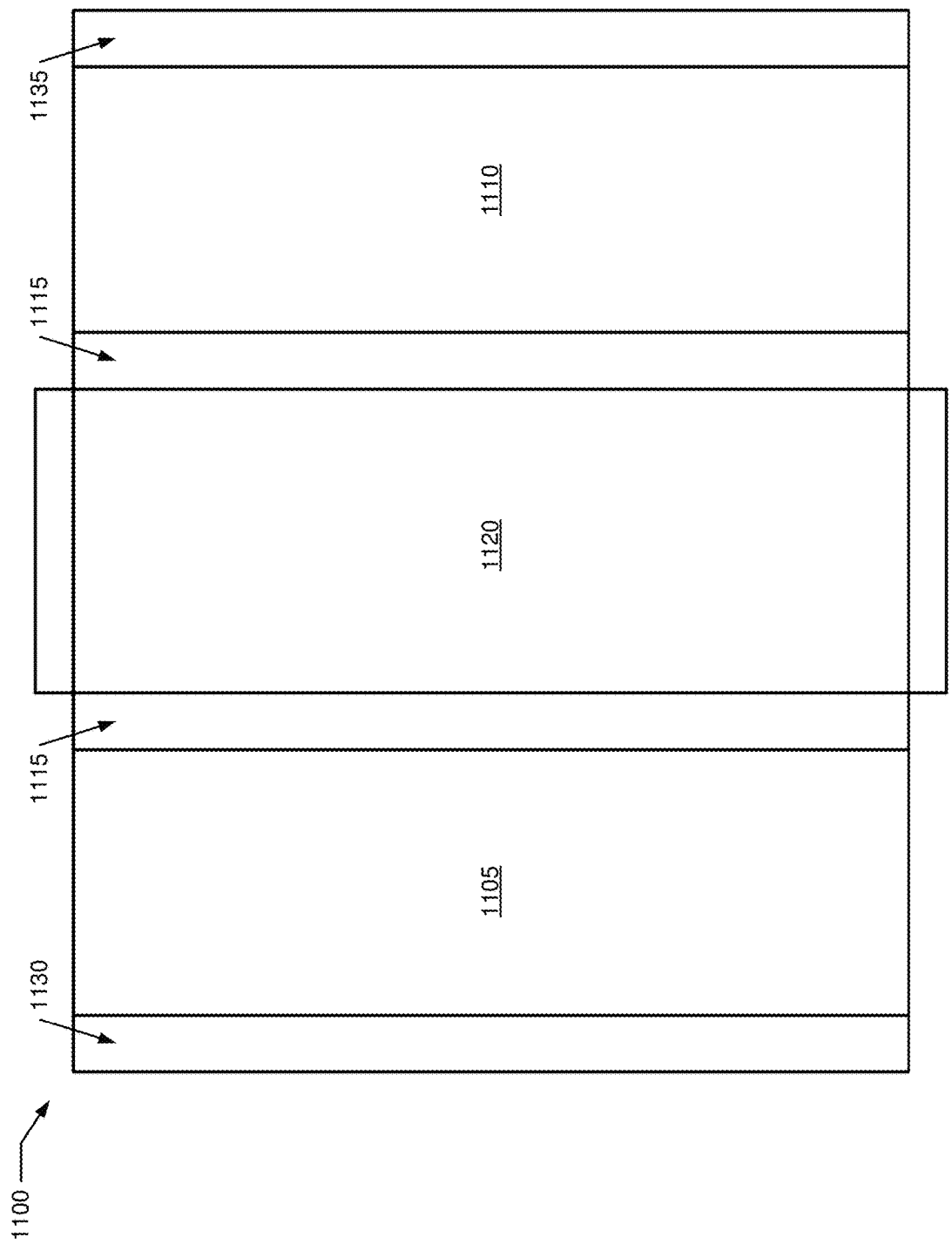
FIG. 11 illustrates a generic electrochemical cell.

FIG. 11 illustrates a generic electrochemical cell 1100. Cell 1100 includes a first electrode 1105 (e.g., a cathode electrode), a second electrode 1110 (e.g., an anode electrode), a liquid electrolyte 1115, a separator 1120, a first current collector 1125, and a second current collector 1130. One or both of the electrodes includes a coordination compound, and more specifically a transition metal cyanide coordination compound. Separator 1120 includes a set of ceramics characteristics as further set forth herein.

Electrode 1105 and electrode 1110 are electrochemically communicated with liquid electrolyte 1115. Separator 1120 is disposed between the electrodes and within liquid electrolyte 1115.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention is not limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An electrochemical cell, comprising:
 a first electrode;
 a second electrode;
 a liquid electrolyte disposed in electrochemical communication with said electrodes; and a separator disposed in said liquid electrolyte and between said electrodes, said separator including a ceramic composition;

wherein one of said electrodes includes a coordination compound;

wherein said coordination compound includes a transition metal cyanide coordination compound identified by Formula I, by $A_aP_b[R(CN)_6]_c(H_2O)_n$ wherein A identifies as one or more alkali cations and P and R each represent one or more divalent or trivalent transition metal cations; wherein a, b, and c are related based on electrical neutrality, $0<a\leq 2$, $b=1$, $0.5<c<1$; and wherein $n=6*(1-z)+d$, and wherein $n>0$; wherein $6*(1-z)$ identifies as a quantity of lattice bound water and d identified as a quantity of non-coordinated water; wherein $d>0$; and wherein said separator includes two or more discrete layers, including a first layer consisting essentially of one or more polymers, and a second layer consisting essentially of a ceramic composition.

2. The electrochemical cell of claim 1 wherein said ceramic composition includes a material identifying as $M_xO_yH_z$, with x, y, z identifying quantities of a metal (M), oxygen (O), and hydrogen (H); wherein $x\geq 1$; wherein $y\geq x+z/2$ and $y\leq 3x+z/2$; and wherein $z\geq 0$ and $z\leq y$.

3. The electrochemical cell of claim 2 wherein M includes at least one of aluminum or silicon.

4. The electrochemical cell of claim 1 wherein said ceramic composition includes particles having sizes <100 nm.

5. The electrochemical cell of claim 1 wherein said separator is configured to include a mass loading greater than 1 gram per square meter of the ceramic composition.

6. An electrochemical cell, comprising:
a first electrode;
a second electrode;
a liquid electrolyte disposed in electrochemical communication with said electrodes; and
a separator disposed in said liquid electrolyte and between said electrodes, said separator including a multilayer construction;
wherein one of said electrodes includes a coordination compound;
wherein said coordination compound includes a transition metal cyanide coordination compound identified by Formula I, by $A_aP_b[R(CN)_6]_c(H_2O)_n$ wherein A identifies as one or more alkali cations and P and R each represent one or more divalent or trivalent transition metal cations; wherein a, b, and c are related based on electrical neutrality, $0<a\leq 2$, $0.5<c<1$; and wherein $n=6*(1-z)+d$, and wherein $n>0$; wherein $6*(1-z)$ identifies as a quantity of lattice bound water and d identified as a quantity of non-coordinated water; wherein $d>0$; and
wherein said separator includes two or more discrete layers, including a first layer consisting essentially of one or more polymers, and a second layer consisting essentially of a ceramic composition.

7. The electrochemical cell of claim 6 wherein said multilayer construction includes particles having sizes <100 nm.

8. The electrochemical cell of claim 6 wherein said separator is configured to include a mass loading greater than 1 gram per square meter of a ceramic composition.

9. A method for manufacturing an electrochemical cell, comprising:
producing a first electrode including a coordination compound;
producing a second electrode;
producing a liquid electrolyte;
producing a separator, said separator including a ceramic composition; and
assembling the electrochemical cell including electrochemically communicating said electrodes to said liquid electrolyte and disposing said separator between said electrodes;
wherein said coordination compound includes a transition metal cyanide coordination compound identified by Formula I, by $A_aP_b[R(CN)_6]_c(H_2O)_n$ wherein A identifies as one or more alkali cations and P and R each represent one or more divalent or trivalent transition metal cations; wherein a, b, and c are related based on electrical neutrality, $0<a\leq 2$, $b=1$, $0.5<c<1$; and wherein $n=6*(1-z)+d$, and wherein $n>0$; wherein $6*(1-z)$ identifies as a quantity of lattice bound water and d identified as a quantity of non-coordinated water; wherein $d>0$; and
wherein said separator includes two or more discrete layers, including a first layer consisting essentially of one or more polymers, and a second layer consisting essentially of a ceramic composition.

10. The method of claim 9 wherein said ceramic composition includes a material identifying as $M_xO_yH_z$, with x, y, z identifying quantities of a metal (M), oxygen (O), and hydrogen (H); wherein $x\geq 1$; wherein $y\geq x+z/2$ and $y\leq 3x+z/2$; and wherein $z\geq 0$ and $z\geq y$.

11. The method of claim 9 wherein said separator is configured to include a mass loading greater than 1 gram per square meter of a ceramic composition.

12. A method for manufacturing an electrochemical cell, comprising:
producing a first electrode including a coordination compound;
producing a second electrode;
producing a liquid electrolyte;
producing a separator, said separator including a discrete multilayer composition; and
assembling the electrochemical cell including electrochemically communicating said electrodes to said liquid electrolyte and disposing said separator between said electrodes;
wherein said coordination compound includes a transition metal cyanide coordination compound identified by Formula I, by $A_aP_b[R(CN)_6]_c(H_2O)_n$ wherein A identifies as one or more alkali cations and P and R each represent one or more divalent or trivalent transition metal cations; wherein a, b, and c are related based on electrical neutrality, $0<a\leq 2$, $b=1$, $0.5<c<1$; and wherein $n=6*(1-z)+d$, and wherein $n>0$; wherein $6*(1-z)$ identifies as a quantity of lattice bound water and d identified as a quantity of non-coordinated water; wherein $d>0$; and
wherein said separator includes two or more discrete layers, including a first layer consisting essentially of one or more polymers, and a second layer consisting essentially of a ceramic composition.

13. The method of claim 12 wherein said multilayer construction includes a material identifying as $M_xO_yH_z$, with x, y, z identifying quantities of a metal (M), oxygen (O), and hydrogen (H)); wherein $x\geq 1$; wherein $y\geq x+z/2$ and $y\leq 3x+z/2$; and wherein $z\geq 0$ and $z\leq y$.

14. The method of claim 12 wherein said separator is configured to include a mass loading greater than 1 gram per square meter of the ceramic composition.

\* \* \* \* \*